Jan. 22, 1929.
R. LA FRANCE
1,699,566
GLASS FORMING MACHINE
Original Filed April 22, 1924    5 Sheets-Sheet 3
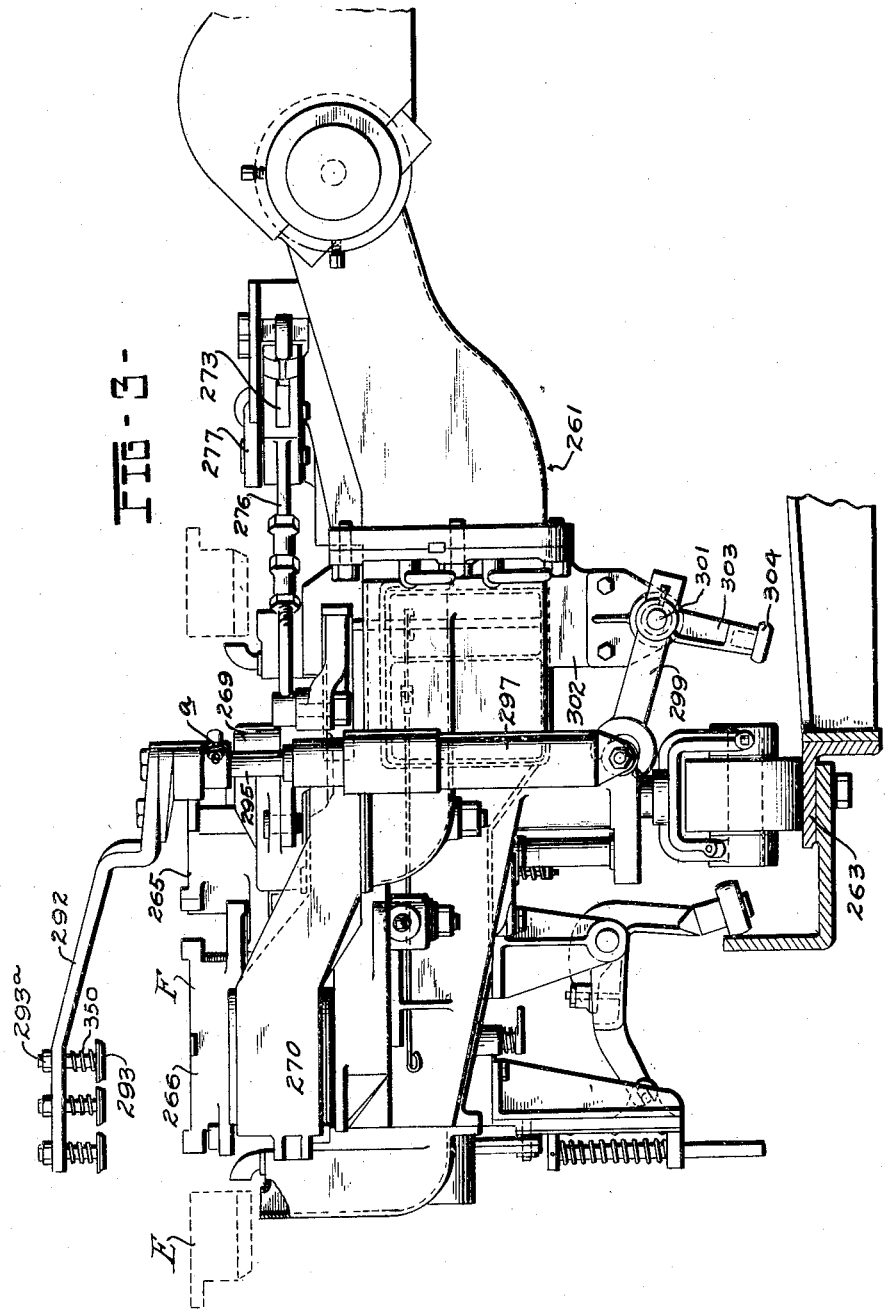
INVENTOR
RICHARD LAFRANCE
BY J.F.Rule
HIS ATTY.

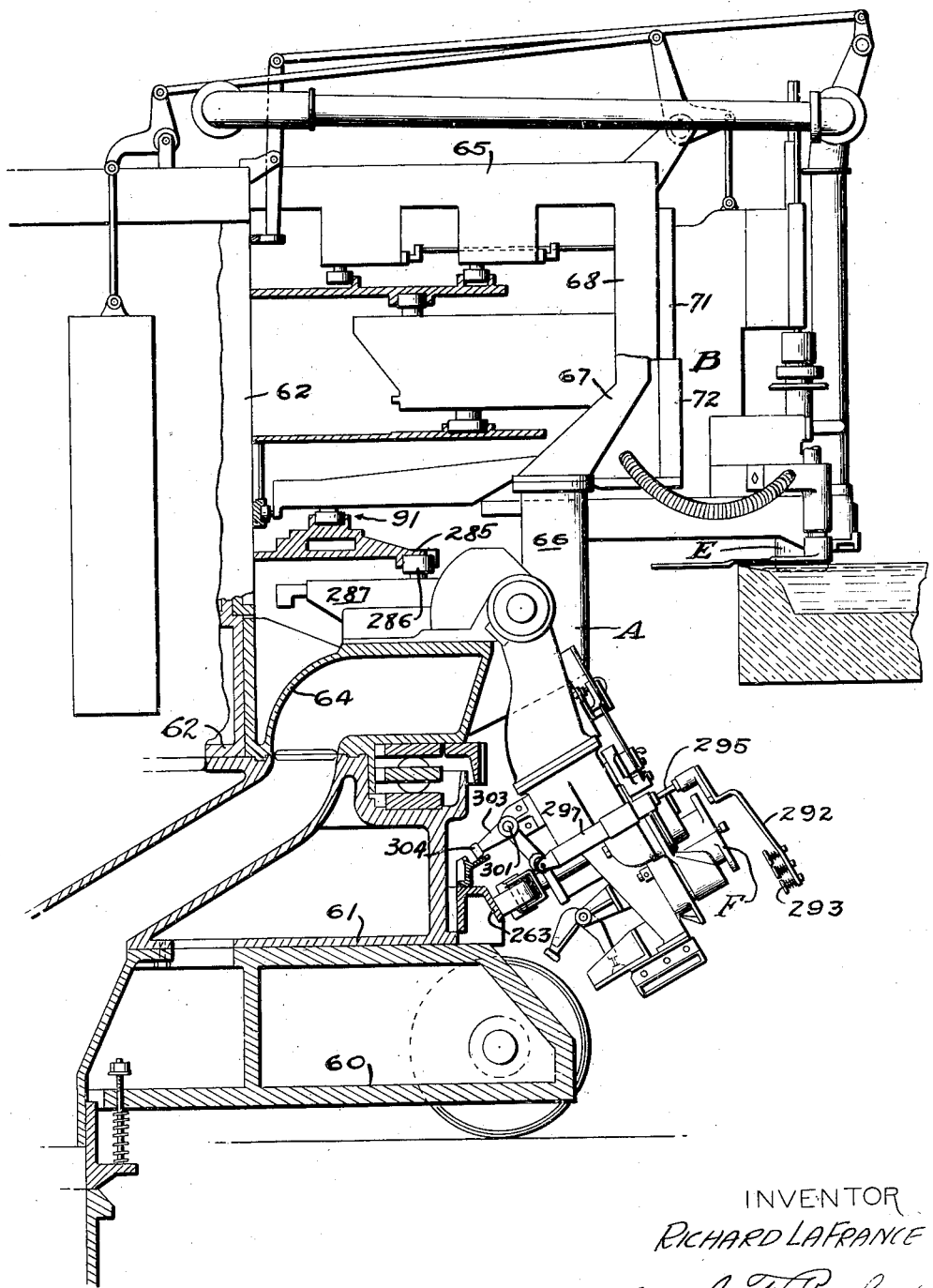

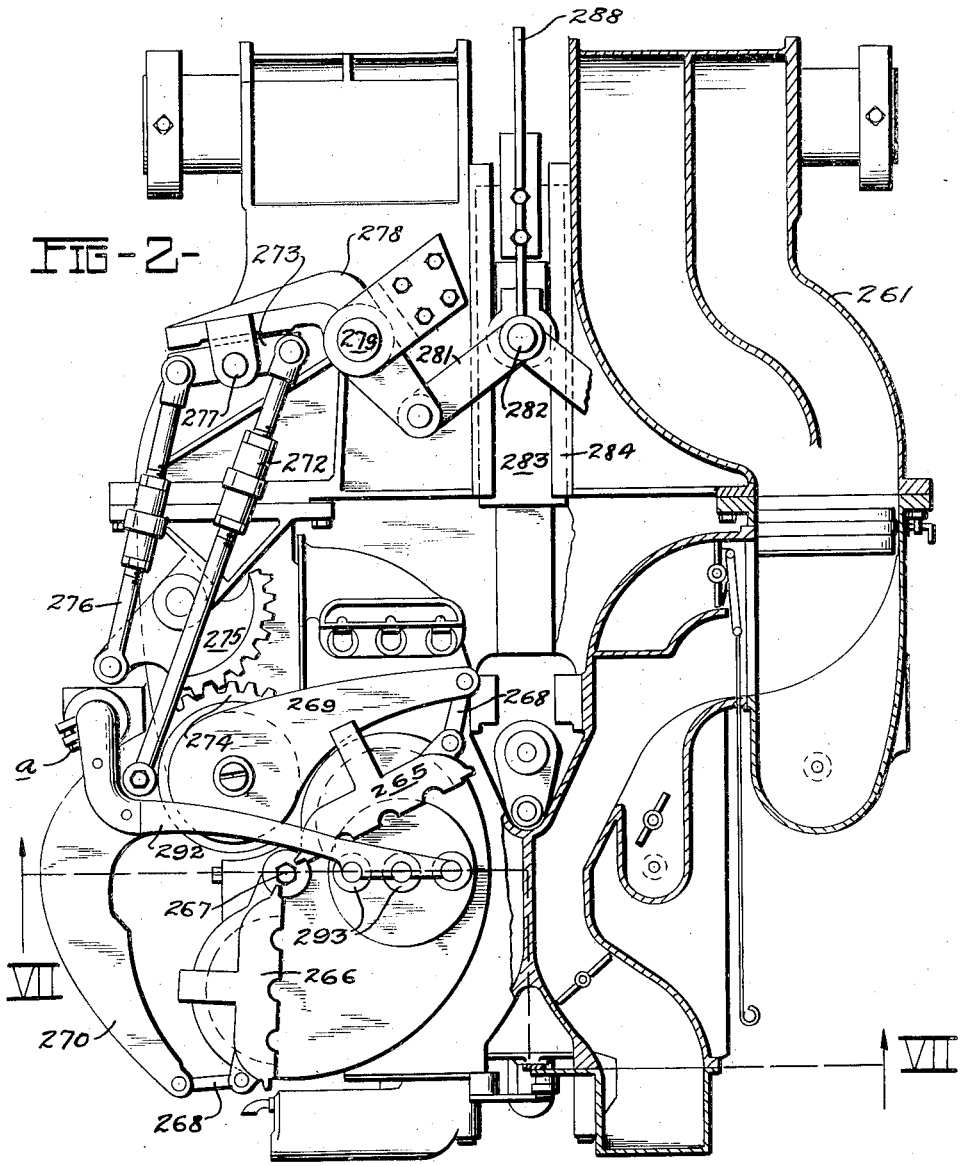

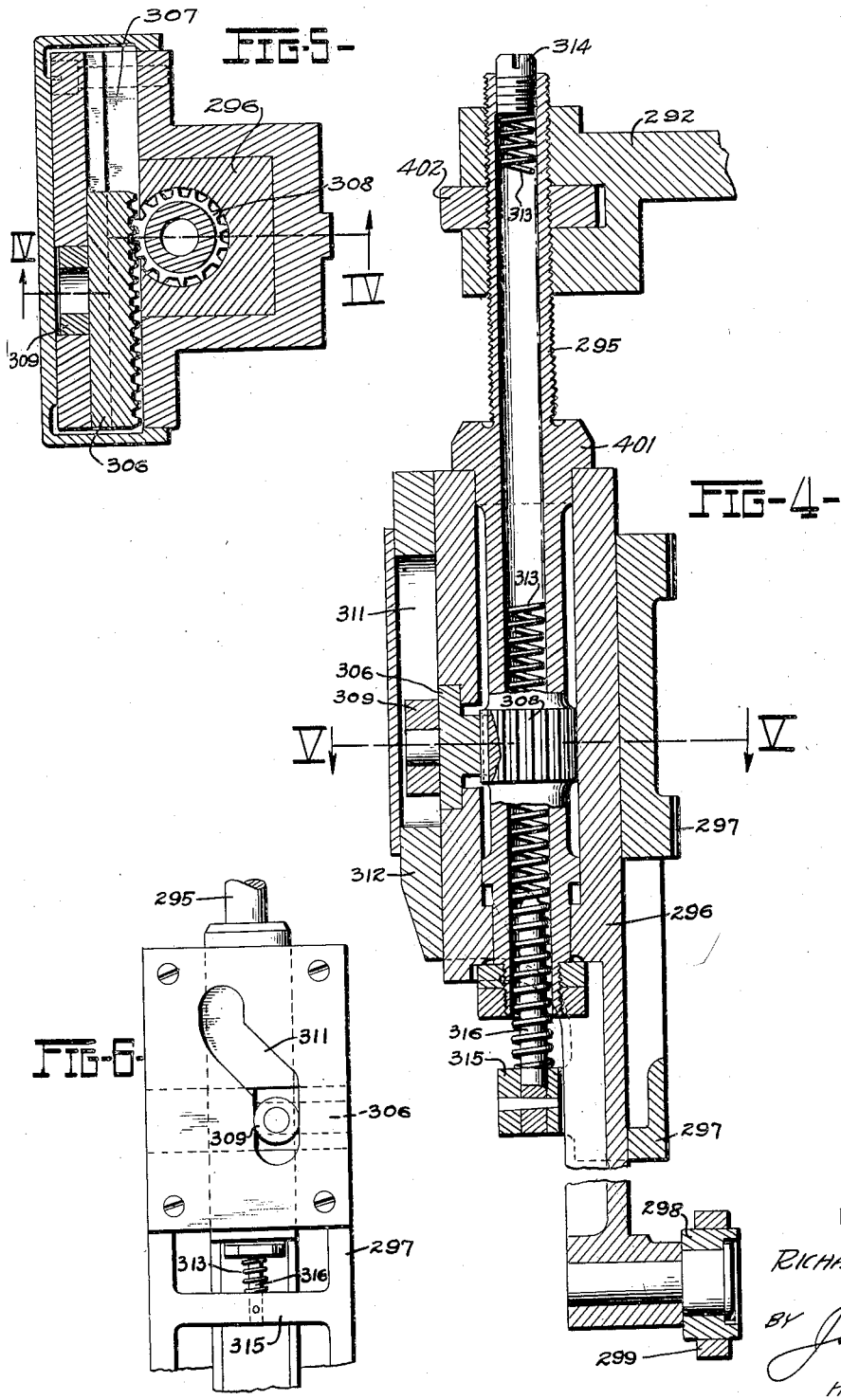

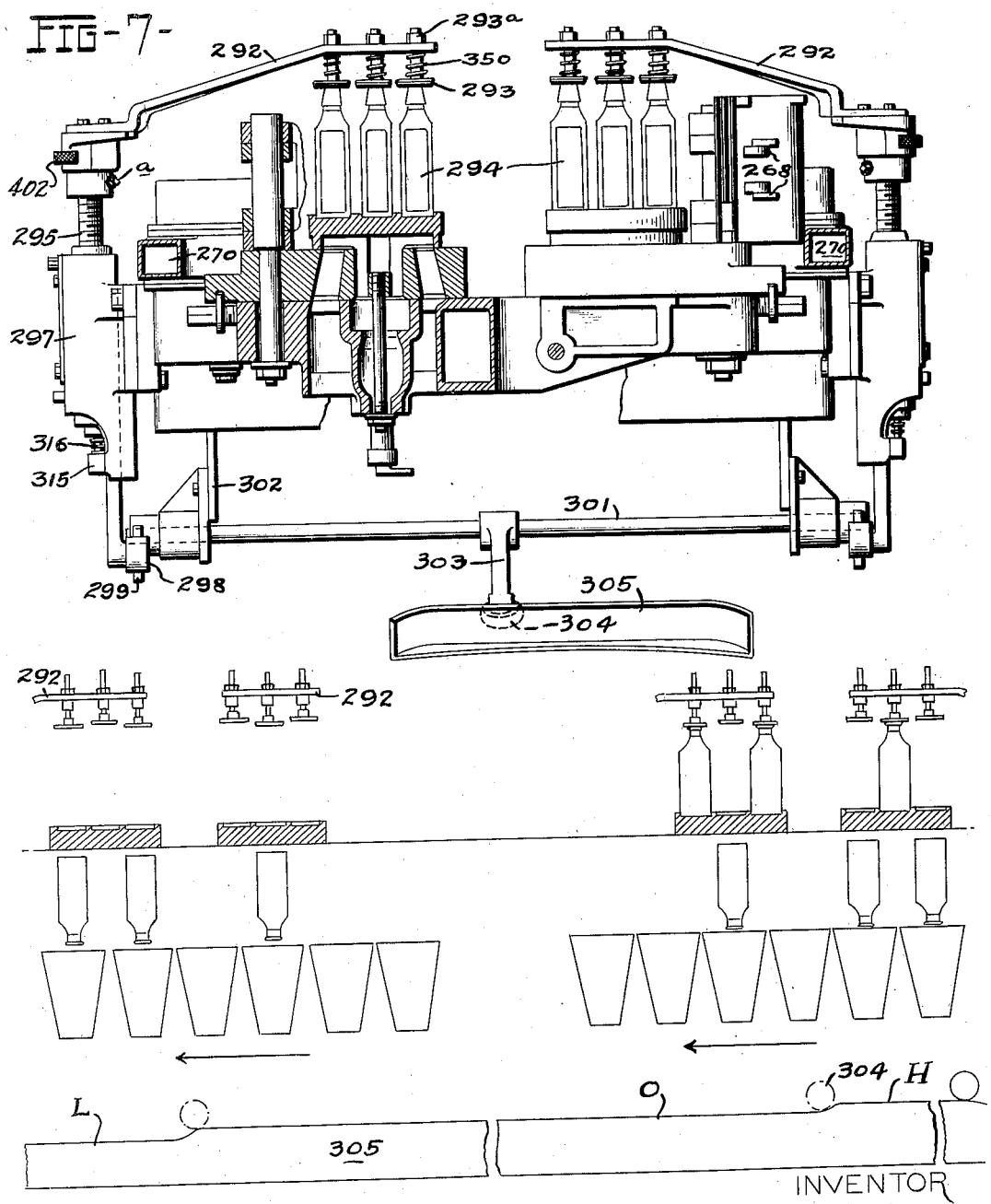

Patented Jan. 22, 1929.

1,699,566

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

GLASS-FORMING MACHINE.

Original application filed April 22, 1924, Serial No. 708,172, and in Canada April 17, 1925. Divided and this application filed September 22, 1926. Serial No. 136,979.

The present invention relates to machines for forming glass articles, and more particularly to machines of the Owens type in which blank molds on a continuously rotating carriage dip into a pool of molten glass and are filled by suction, the blanks being later transferred to finishing molds in which they are blown to finished form. In machines of this type, a series of heads or units are arranged at equal intervals around the mold carriage, each unit comprising a blank mold or molds into which the glass is drawn by suction, a cooperating finishing mold or molds, and mechanism for effecting the suction, blowing and various mechanical operations required in forming the articles.

In a great majority of machines of this type now in use, a single gathering mold is provided on each head or unit so that only one blank of glass is gathered at a time. In other machines, each mold is provided with a plurality of mold cavities, so that a number of blanks are gathered simultaneously, such blanks being then formed into parisons which are transferred to finishing molds having a plurality of mold cavities.

An object of the present invention is to provide mechanism by which discharge of the bottles of each head may be accurately controlled, thereby overcoming the difficulty which has heretofore been experienced of dropping the bottles without having them strike each other. This provision also materially simplifies the operating adjustments. Other objects will appear hereinafter.

The present application is a division of my co-pending application Serial Number 708,172, filed April 22, 1924, on which Patent 1,641,497 was granted September 6, 1927.

In the accompanying drawings:

Figure 1 is a sectional elevation of the machine, parts being broken away.

Figure 2 is a part sectional plan view of the finishing mold carrying frame, showing a finishing mold in open position and a knock-out arm in operative position.

Figure 3 is a side elevation of the finishing mold carrying frame, showing the mold in open position and illustrating the knock-out arm actuating means.

Figure 4 is a sectional view at the line IV—IV on Fig. 5, showing the mechanism for operating the knock-out arm.

Figure 5 is a section at the line V—V of Figure 4.

Figure 6 is a front elevation of the cam controlling the rotative movement of the knock-out arm.

Figure 7 is a part sectional elevation at the line VII—VII on Figure 2.

Figure 8 is a diagrammatic illustration of mechanism for causing progressive discharge of articles from the finishing molds.

Referring particularly to Figure 1, the machine comprises a base 60 on which is mounted a casting 61 supporting the mold carriage which rotates continuously about a central stationary column 62. Stationary cams for actuating various parts of the machine are mounted on said column. The mold carriage comprises a lower frame portion 64 and an upper frame portion 65, united by the frames which support the individual heads or units arranged at equal intervals around the carriage. Each of said units includes blank molds, finishing molds and mechanism for actuating the molds and for effecting the various operations on the glass. Each unit is supported by a frame-work A (Fig. 1) on the mold carriage, said frame-work including standards 66 rising from the frame member 64, upwardly and outwardly inclined frame members 67 and vertical portions 68. Mounted to reciprocate vertically in the frame A is a frame B including vertical slide bars 71 slidable in guideways 72 in the frame A. Bolted to the lower end of the frame B is a blowing head which carries the neck molds (not shown).

The blank molds E gather a plurality of blanks from the tank 133 and at a given station are elevated out of contact with the glass in the tank. A cut-off is then actuated to sever portions of glass from the lower ends of the charges and to close the lower ends of the blank mold cavities. The glass in these cavities is shaped to form a plurality of parisons, after which the blank mold sections are separated from the parison body portions by cam mechanism 91, thereby leaving the parisons suspended from the neck molds. Continued movement of the mold carriage causes elevation of finishing molds to a position in which they enclose the body portions of the parisons. This elevation of the finishing molds is caused by a stationary cam track 263, as will be hereinafter apparent.

The mold frame 261 carries a pair of finishing molds F, each of which comprises an inner section 265 and an outer section 266 mounted to swing about a pivot 267 for opening and closing the mold. Said sections are respectively connected through links 268 to arms 269 and 270 having a pivot 271. The arm 269 is connected through a link 272 to an equalizing lever 273. The arm 270 is formed with a gear segment 274 running in mesh with a gear segment 275, the latter connected through a link 276 to the lever 273. The links 272 and 276 are separately adjustable in length for individually adjusting the mold sections to their closed position. The equalizing lever 273 is connected by a pivot 277 to a lever 278 pivoted at 279 to the mold frame. Each finishing mold frame carries a pair of the levers 278 and the operating connections just described between said levers and the molds. The levers 278 are connected through a pair of links 281 to a pivot pin 282 mounted in a slide bar 283 slidable radially of the machine in guides 284 on the mold frame. The slide 283 is actuated by a stationary cam 285 (Fig. 1) on which runs a cam roll 286 on a slide block 287 which has an operating connection 288 with the slide 283.

In accordance with the present invention and for the purpose of controlling the discharge of articles from the several heads and retaining them in the heads until the mold sections have completely opened and the discharge stations have been reached, a pair of "knock-out" arms 292 are carried on each finishing mold frame. Each of these arms carries a series of knock-out disks 293 which temporarily hold the bottles 294 or other blown articles during the opening of the finishing molds. Each arm 292 is secured by a set screw $a$ (Fig. 7) to the upper end of a rock shaft 295 mounted for rotative movement in a non-rotating vertical rod or casting 296, the latter mounted to reciprocate vertically in a casing 297 secured to the mold frame. A roll 298 on the lower end of the rod 296 is engaged by the forked end of a rock arm 299 on the end of a rock shaft 301. This rock shaft, as shown in Figure 7, is journalled in bearings on hangers 302 depending from the mold frame. The rock shaft is arranged to actuate both knock-out arms through the connections just described. A rock arm 303 on the shaft 301 carries a roll 304 which runs on a stationary cam 305.

The shaft 295 is held against endwise movement in the casting 296 by a shoulder 401 formed on said shaft, and nuts threaded on the lower end of the shaft. The knock-out arm 292 can be adjusted up or down on its shaft by loosening the set screw $a$ and rotating an adjusting disk or nut 402 threaded on the shaft 295. A rack bar 306 (Figs. 4 and 5) is mounted to reciprocate in a guideway 307 extending transversely in the member 296. Rack teeth thereon mesh with a gear 308 formed on the hollow shaft 295. The rack bar carries a roll 309 which runs in a cam slot 311 formed in the front plate 312 of the casing 297.

The knock-out arms 292 are normally in their elevated outwardly swung position shown in Figure 3. Shortly before the finishing molds open to discharge the bottles, the arms are swung inward and downward to engage the knock-out disks with the bottles and hold them while the molds open. This takes place when the cam 305 engages the arm 303 and rocks the shaft 301, thereby pulling the rock shafts 295 downward. During this downward movement, the roll 309 (Fig. 6) travels along the inclined portion of the cam 311 so that the rack 306 is moved lengthwise and thereby rotates the shaft 295 and swings the knock-out arm inward during its downward movement. This swinging movement is completed before the disks 293 reach the bottles, the final movement, controlled by the vertical portion of the cam, being directly towards the bottles. The bottles are held by the disks during the opening of the finishing molds. When the mold sections have been swung open out of the path of the bottles, the knock-out arms are lifted and returned to the Figure 3 position. This return movement takes place when the rock arm 303 runs off the cam and is effected by a coil spring 313 (Fig. 4) within the hollow rock shaft 295. This spring is held under compression between a screw plug 314 in the upper end of the shaft and a lug 315 on the member 297. A pin 316 projects upward from said lug within the coil spring to hold the latter in position.

The knock-out disks 293 may be so adjusted that all the disks on a pair of arms 292 disengage the bottles simultaneously when the arms are lifted, thereby permitting all the bottles on one head to drop at the same time. Sometimes, however, it is desirable to discharge the bottles in groups of two or more in succession. This can be done by individually adjusting the disks up or down on the arms 292, as by means of adjusting nuts 293$^a$ (Figs. 3 and 7). The adjustment may be such that each bottle will be released at the same discharging position as the carriage rotates. The desired manner or order in which the bottles are discharged depends on the particular mechanism employed to handle the bottles as they are discharged. By changing the setting of the adjusting nuts 293$^a$, the bottles comprising any particular group may be changed to meet varying requirements.

To further facilitate discharge of predetermined groups of bottles, the cam 305 (Fig. 8) may be formed to rock the rock arm predetermined degrees at intervals, causing successive release of the groups of ware. Due to the individual adjustment of the disks 293 and their retention in their lowermost position under the influence of coil expansion springs 350, it is evident that the arms 292 must be elevated to several different degrees so that the several groups of bottles may be discharged from the units in progressive order. Therefore, the active face of the stationary cam 305 (see Fig. 8) is formed with a high portion H which effects positive engagement of the disks 293 with all of the bottles in a head or unit. An intermediate offset O is formed adjacent and immediately following the high portion H. Engagement of the cam roll 304 with this intermediate portion causes a slight rocking of the arm 303, resulting in lifting of certain of the disks 293 and release of the first group of bottles or other articles. Release of the second and last group is effected by further lifting of the arms 292, such lifting being caused by rocking of the rock arm 303 at the time the cam roll 304 contacts with the low portion or offset L of the stationary cam 305.

Modifications may be resorted to within the spirit and scope of my invention.

What I claim is:

1. In a machine for forming glass articles, the combination of a rotating mold carriage comprising a plurality of heads or units, a plurality of molds carried by each unit, each mold having a plurality of mold cavities, means for effecting a simultaneous discharge of articles from all the mold cavities of a mold, and adjusting means by which articles concurrently formed in a mold are caused to be discharged in succession.

2. In a machine for forming glass articles, the combination of a rotating mold carriage comprising a plurality of heads or units, a plurality of molds carried by each unit, each mold having a plurality of mold cavities, separate devices individual to the molds for controlling the discharge of articles from the several molds on a unit, each of said controlling devices operable to effect a simultaneous discharge of articles from all the mold cavities of the mold controlled by said device, and adjusting means associated with each said controlling device by which articles concurrently formed in the associated mold are caused to be discharged in succession.

3. In a machine for forming glass articles, the combination of a mold, a rock shaft, a rock arm thereon, means carried by said arm to engage and hold articles in the mold during the opening of the mold, a cam operable to move said shaft lengthwise, a pinion on said shaft, a rack to rotate said pinion and mounted to move with the shaft as the latter moves lengthwise, and a cam connected to operate said rack and thereby rotate the shaft during the movement of the shaft in the direction of its length.

4. In a glass forming machine, the combination of a rock shaft, a rock arm thereon, a rack and pinion for rotating the rock shaft, means to move said rock shaft lengthwise, and a cam operable to actuate said rack during said lengthwise movement of the shaft and thereby rock the shaft and rock arm, and means on said arm for engaging articles on the machine and controlling their discharge from the machine.

5. In a machine for forming glass articles, the combination of a rotating mold carriage, a mold thereon, a rock shaft, a rock arm thereon, means on said arm for engaging articles formed in the mold, a hollow member in which said shaft is mounted to rock, a rack carried by said hollow member, a pinion on said shaft arranged to be driven by the rack, a stationary cam operable to move said shaft and hollow member lengthwise, and a cam mounted to travel with said shaft and connected to operate the rack during the lengthwise movement of the shaft and thereby rotate said shaft and rock arm.

6. In a machine for forming glass articles, the combination of a rotating mold carriage comprising a plurality of heads or units, a plurality of molds carried by each unit, and devices individual to the articles in all the molds of a unit for controlling discharge of the articles from the units, each of said devices being adjustable independently of the others to control the time of discharge of the corresponding article.

7. In a glass forming machine, the combination of a rock shaft, a rock arm thereon, a rack and pinion for rotating the rock shaft, means to move said rock shaft lengthwise, a cam operable to actuate said rack during said lengthwise movement of the shaft and thereby rock the shaft and rock arm, and adjustable means individual to articles being formed, said means carried on said arm for controlling the discharge of articles from the machine.

8. In a machine for forming glass articles, the combination of a rotating mold carriage comprising a plurality of heads or units, a plurality of molds carried by each unit, each mold having a plurality of mold cavities, swinging arms individual to the molds on a unit, independently adjustable disks carried by said arms, means to swing the arms and move said disks into engagement with articles in the molds and hold the articles during opening of the molds, and means for lifting the arms to separate the disks and said articles permitting discharge of the latter from the unit.

9. In a machine for forming glass articles, the combination of a rotating mold carriage comprising a plurality of heads or units, a plurality of molds carried by each unit, each mold having a plurality of mold cavities, swinging arms individual to the molds on a unit, disks carried by said arms, adjustable yieldable connection between each disk and its carrying arm, means to swing said arms and move said disks into engagement with articles in the molds and hold said articles during opening of the molds, and means for elevating the arms to lift the disks out of engagement with said articles permitting discharge of the latter from the unit.

10. In a machine for forming glass articles, the combination of a rotating mold carriage comprising a plurality of heads or units, a plurality of molds carried by each unit, means for opening the molds, holding devices individual to the articles in the molds for engaging said articles and controlling their discharge, means for individually adjusting said devices, and automatic means for lifting the holding devices after the molds have opened to effect a discharge of the articles from the molds.

Signed at Toledo, in the county of Lucas and State of Ohio, this 20th day of September, 1926.

RICHARD LA FRANCE.